3,662,000
METHOD FOR TREATING A REACTION MIXTURE CONTAINING HYDROPEROXIDES
Ken Ito and Hiroshi Kaminaka, Toyonaka-shi, Norio Kotera, Amagasaki-shi, Shinji Yamamoto, Iwao Dohgane, and Kosuke Shigehiro, Nashinomiya-shi, Hiroshi Kuruma, Takarazuka-shi, Takashi Chinuki, Toyonaka-shi, Hiroshi Yoshitake and Kenji Tanimoto, Minoo-shi, Shinichi Hasegawa, Amagasaki-shi, and Nobuki Kobayashi, Osaka, Japan, assignors to Sumitomo Chemical Company, Ltd., Osaka, Japan
No Drawing. Filed Mar. 6, 1969, Ser. No. 805,032
Claims priority, application Japan, Mar. 14, 1968, 43/16,915
Int. Cl. C07c *49/06, 49/08, 49/30*
U.S. Cl. 260—593                                    7 Claims

ABSTRACT OF THE DISCLOSURE

In a process for obtaining an aromatic hydroxy compound and an aliphatic ketone by contacting an alkyl aromatic hydrocarbon with molecular oxygen containing gas, for example, $O_2$ gas or air, to obtain a mixture containing an aralkyl hydroperoxide and subjecting the hydroperoxide to an acid catalyzed cleavage, an improvement which comprises treating the mixture containing aralkyl hydroperoxide with an aqueous alkaline solution, for example, NaOH, prior to the acid-catalyzed cleavage step, whereby an acidic corrosive compound existing in the mixture is substantially excluded.

---

The present invention relates to a process for treating a reaction mixture containing an aralkyl hydroperoxide obtained by contacting an alkyl aromatic hydrocarbon with oxygen gas or molecular oxygen containing gas. (The aforesaid reaction liquid is designated hereinafter as hydroperoxide containing mixture.) More particularly, the present invention relates to a process for treating thus-obtained hydroperoxide containing mixture in a series of steps including an acid-catalyzed cleavage step, wherein an aromatic hydroxy compound and an aliphatic ketone are obtained from said hydroperoxide.

Heretofore, various methods were known to produce an aromatic hydroxy compound and an aliphatic ketone from an alkyl aromatic hydrocarbon, wherein said alkyl aromatic hydrocarbon is contacted with oxygen gas or gas containing oxygen molecules to obtain the corresponding aralkyl hydroperoxide, which hydroperoxide is thereafter cleft, in the presence of an acidic substance, to produce said aromatic hydroxy compound and aliphatic ketone. As one of such methods, for instance, the cumene process is well-known, wherein phenol and acetone are produced from cumene.

These methods are extremely efficient in producing phenols. Furthermore, they are one of the most economically advantageous methods because they simultaneously give aliphatic ketones which are also very useful products.

However, the biggest problem in carrying out these methods on an industrial scale was that an extremely complicated and huge system of equipment was required for separation and purification processes because a mixture containing the desired products of aromatic hydroxy compound and aliphatic ketone also contains many other kinds of substances which must be separated, such as, for instance, unreacted alkyl aromatic hydrocarbon, several kinds of undesired by-products, tarry substances and water and so on. Furthermore, it was considered as inevitable to construct most of the separation and purification systems including, as their major part, fractionating towers, with expensive material such as stainless steel because said mixture exhibits an extremely strong corrosive action against mild steel, particularly at a high temperature. Because of this, the construction of refinement systems required a great expenditure and, as a result, a feature of the cumene process of being economically advantageous was greatly weakened.

We have now discovered, after having repeatedly conducted detailed researches about the corrosive action of a mixture containing an aromatic hydroxy compound and an aliphatic ketone obtained by an acid-catalyzed cleavage of an aralkyl hydroperoxide thereinafter called as products-containing crude mixture), that (1) the corrosive action is due to an acidic organic substance which is produced as by-product in the course of an oxidizing step and enter into said products-containing crude mixture, although we failed to identify the exact composition of said acidic organic substance and (2) therefore, when said acidic organic substance is substantially excluded from the separation and purification systems, corrosion of most of the equipment for use in separating and purifying each component of said products-containing crude mixture can be substantially prevented, even if said equipment is made with mild steel.

It is an object of this invention to provide, based on the aforesaid new discovery, a method for decreasing the corrosive action of products-containing crude mixture in the separation and purification steps of said crude mixture, by preventing the aforesaid corrosive acidic substance from entering into the separation and purification steps.

Namely, the present invention is characterized in contacting a hydroperoxide mixture, which is obtained by oxidizing an alkyl aromatic hydrocarbon, with an alkaline aqueous solution prior to supplying said hydroperoxide to the acid-catalyzed cleavage steps.

At the first glance, one tends to assume that said acidic organic substance produced as by-product is neutralized and completely removed after reaction by filtration, in the case wherein said acidic substance is solids and by decantation in case when said acidic substance is soluble in an aqueous alkaline solution even in a conventional method, because an oxidation reaction of an alkyl aromatic hydrocarbon aimed to obtain a hydroperoxide is conducted ordinarily with an addition of an alkaline substance. However, we have now discovered that a considerable amount of acidic organic substance actually remains unremoved in such conventional method as described above and, as a result, the unremoved acidic organic substance causes corrosion in the final separation and refinement steps.

It may be clearly understood from the foregoing description that this invention has remarkably great utility in reducing corrosion of separation and refinement equipment and apparatus for separating and refining each component from a mixture containing an aromatic hydroxide and an aliphatic ketone obtained from an acid-catalyzed cleavage of an aralkyl hydroperoxide, and also in enabling the use of low-cost material such as mild steel in the construction of most part of said separation and refinement systems.

In the following, the present invention will be further described in detail.

This invention can apply to all the hydroperoxide reaction mixtures that contain a tertiary aralkyl hydroperoxide. From an industrial point of view, the most significant among them are those hydroperoxide reaction mixtures obtained by oxidizing benzene, naphthalene and biphenyl compounds having one to five secondary alkyl group(s) which group(s) consist(s) of from three to six carbon atoms and said benzene, naphthalene and biphenyl compounds having or not having as the other substituents methyl, ethyl or tertiary butyl groups.

More particularly, as for alkyl aromatic hydrocarbons to be oxidized there are named, for example, cumene, sec-butylbenzene, cyclohexylbenzene and each isomer of, and a mixture of two or more isomers of, sec-amylbenzene, cymene, isopropylxylene, ethylisopropylbenzene, diisopropylbenzene, isopropyltert-butylbenzene, isopropylnaphthalene, isopropylbiphenyl and others.

The method of oxidizing these above-stated and other alkyl aromatic hydrocarbons is not limited to a particular method, although a better result can be expected by removing alkaline stabilizers which are added in the course of an oxidization step and, if any substances which are insoluble in said hydroperoxide reaction liquid exist, by removing such insoluble substances by filtration, sedimentation, liquid separation prior to applying the process of this invention.

An alkaline substance which constitutes an alkaline aqueous solution in a method within the claims of the present invention can be any inorganic compound as far as said inorganic compound dissolves in water and thereby shows alkaline. From a viewpoint of industrial utilization, however, such inorganic compounds can be used, for instance, as oxides or hydroxides of sodium, potassium, and calcium, ammonia water, carbonates of, bicarbonates of, phosphates of, hydrogen phosphates of, sodium and potassium and others.

A concentration of an alkaline substance to be employed in a method within the claims of this invention can be from 0.01% by weight to nearly a saturation point, although a better result can be obtained by employing a concentration degree of 0.1% to, if soluble, 10% by weight. The use of an alkaline substance having an unnecessarily high concentration will in some cases give an adverse effect such as preventing corrosive substances from transferring into the water layer or, in case a strong alkaline substance is used, causing a loss of the hydroperoxides by forming salts with said hydroperoxides.

A quantity ratio by weight of an alkaline aqueous solution, based on that of hydroperoxide reaction liquid, can be from one twentieth to 20 times and, preferably, from one fifth to five times.

As a method wherein said alkaline aqueous solution is subjected to contact with said hydroperoxide-containing mixture (within the claims of this invention), there can be recommended such methods as a method wherein aforesaid both liquid phases are thoroughly dispersed and mixed by means of a stirring tank or a recycling mixing pump and thereafter the two liquids are separated by allowing them to separate or a method wherein said two liquids are subjected to counter-current, multistage contact in an extracting tower.

A temperature to be observed during the above-stated process may be preferably from 0° to 100° C. ordinarily, although care should be taken to stability of hydroperoxides and solubility in the water layer.

After said hydroperoxide-containing mixture is subjected to contact with said alkaline aqueous solution in a method within the claims of this invention, said hydroperoxide-containing mixture is supplied to the acid-catalyzed cleavage step as it is or after a content ratio of hydroperoxides is raised by removing, by distillation, unreacted alkyl aromatic hydrocarbons.

For the purpose of giving a better understanding of the invention, the following illustrative examples are given. It is needless to say, however, these examples shall not be construed to restrict the present invention in any way.

EXAMPLE 1

Cumene was subjected to contact with air at a temperature of 120° C. in the presence of 0.1% by weight of potassium hydroxide, whereby a mixture containing 24% of cumene hydroperoxide was obtained. After potassium hydroxide was removed by filtration, the thus-obtained filtrate was divided in two parts. One of said two parts was shaken for 10 minutes at a room temperature together with a half part by weight of 1% aqueous solution of sodium bicarbonate and allowed to stand for 15 minutes, thereafter the liquid layers were separated. From the thus-obtained oil layer, unreacted cumene was removed by distillation, whereby a content of cumene hydroperoxide was made to 70%. The resultant was cleft, with an addition of acetone and a small quantity of concentrated sulfuric acid, to phenol and acetone and thereafter the remaining sulfuric acid was neutralized with a 5% aqueous solution of caustic soda and the water layer containing sodium sulfate was separated. From the thus obtained products-containing crude mixture, acetone and a small quantity of water still existing in said crude mixture were removed by distillation to obtain a bottom liquid, which bottom liquid containing 55% of phenol, 24% of cumene, 11% of $\alpha$-methylstyrene, 5% of acetophenone and about 5% of heavy contents and others, was used as a sample. In the sample liquid, a test plate of mild steel was immersed for 120 hours at a temperature of 160° C.

No strains or corroded holes were recognized on the test plate when it was taken out after the immersion, although the surface luster was lost only very slightly. A corrosion thickness for a year calculated from the weight loss was 0.026 mm.

Comparative Example 1

A test liquid of almost identical composition as that of the test liquid obtained in the aforesaid Example 1 was obtained by subjecting the remainder of the two parts of hydroperoxide reaction liquid divided in the Example 1 to the same procedures as in Example 1, except that the processing with sodium bicarbonate was omitted.

A test plate of mild steel was immersed in said test liquid for 72 hours at a temperature of 160° C. Corrosion was recognized over the whole surface of the test plate when said plate was taken out after the immersion. The corrosion thickness for a year calculated from the weight loss measured after the strains were removed by washing reached 1.9 mm.

EXAMPLE 2

A mixture of isomers of cymene was subjected continuously to contact with air, under pressure and at a temperature of 135° C., in the presence of the same weight of a 3% aqueous solution of sodium carbonate and 0.01% by weight of sodium stearate, whereby a mixture of the oil layer and alkaline water layer was obtained, wherein said oil layer contained 45% by weight of cymene hydroperoxides and said water layer contained sodium isopropyl benzoate. Said two layers were continuously taken out by separation. The oil layer was mixed with the same weight of a 3% aqueous solution of sodium carbonate in a continuous stirring tank at a temperature of 50° C., whereafter the oil and water layers were separated.

From the oil layer thus contacted with the alkaline solution, the unreacted cymene and a small quantity of water existing in said oil layer were removed by distillation, whereby the concentration of hydroperoxides was made to 60%. Thereafter, the resultant was cleft, in the presence of acetone and a small quantity of concentrated sulfuric acid, to a mixture of isomers of cresol and acetone. The reaction liquid was then neutralized with caustic soda. The water layer containing sodium sulfate as solute was removed by separation, whereby a products-containing crude mixture was obtained. From said crude mixture, acetone and water together with a part of unreacted cymene which is azeotropic with water were removed by distillation, whereby a bottom liquid was obtained, which bottom liquid contained about 1% of light boiling fraction, 31% of cymene, 8% of ar-$\alpha$-dimethylstyrene, 47% of cresol, 5% of ar-methylacetophenone, about 8% of high boiling fraction and less than 0.1% of water content.

Similar tests as conducted in Comparative Example 1 were carried out with the following two kinds of test liquids: (1) a test liquid obtained by operating exactly the same way as described above in Example 2, except that a process to subject the same hydroperoxide reaction liquid as above in Example 2 to contact with an alkaline aqueous solution was omitted, and (2) a sample liquid obtained by processing with the alkaline aqueous solution described above in Example 2. The test temperature was 180° C. and test time was 72 hours. The results of the tests were as shown in Table 1.

TABLE 1.—CORROSION OF MILD STEEL TEST PLATES

| Sample liquid No. | 1 | 2 |
|---|---|---|
| Quality of test liquids | Not processed with an alkaline aqueous solution. | Processed with an alkaline aqueous solution. |
| Corrosion rate, mm./year. | 2.3 | 0.024. |
| Appearance | Entire surface was corroded, stains. | Almost no change. |

What is claimed is:

1. In a process for producing a hydroperoxide-containing mixture comprising oxidizing a tertiary alkyl aromatic hydrocarbon selected from the group consisting of benzene, naphthalene and biphenyl compounds having one to five secondary alkyl groups of three to six carbon atoms and methyl-, ethyl- and tertiary butyl-substituted benzene, naphthalene and biphenyl compounds having one to five secondary alkyl groups of three to six carbon atoms, with a molecular oxygen-containing gas in the presence of an alkaline stabilizer and removing the alkaline stabilizer and substances insoluble in the thus produced hydroperoxide-containing mixture from said mixture by filtration, sedimentation or liquid separation, the improvement comprising:

thoroughly dispersing and mixing at a temperature of from room temperature to 100° C. (1) the hydroperoxide-containing mixture freed from said alkaline stabilizer and said insoluble substances and (2) an aqueous solution of an alkali selected from the group consisting of ammonia, oxides and hydroxides of sodium, potassium and calcium, and carbonates, bicarbonates, phosphates and hydrogen phosphates of sodium and potassium and thereafter separating said aqueous solution of alkali from said hydroperoxide-containing mixture whereby acidic corrosive impurities are removed from the latter.

2. The process according to claim 1, wherein a concentration of said aqueous solution of alkali is from 0.01% by weight to substantially the saturation point.

3. The process according to claim 1, wherein the concentration of said aqueous solution is from 0.1% to 10% by weight.

4. The process according to claim 1, wherein the quantity of said aqueous solution to be used is from one twentieth to 20 times by weight based on the weight of said hydroperoxide-containing mixture.

5. The process according to claim 1, wherein the quantity of said alkaline aqueous solution to be used is from one fifth to five times by weight based on the weight of said hydroperoxide-containing mixture.

6. The process as claimed in claim 1 wherein said tertiary alkyl aromatic hydrocarbon is selected from the group consisting of cumene, sec-butylbenzene, cyclohexylbenzene, and each isomer of and a mixture of two or more isomers of sec-amylbenzene, cymene, isopropylxylene, ethylisopropylbenzene, diisopropylbenzene, isopropyl-tert-butylbenzene, isopropylnaphthalene and isopropylbiphenyl.

7. In the process for producing an aromatic hydroxy compound and an alkyl or cycloalkyl ketone comprising the steps of
(1) contacting an alkyl aromatic hydrocarbon selected from the group consisting of cumene, sec-butylbenzene, cyclohexylbenzene, and each isomer of and a mixture of two or more isomers of sec-amylbenzene, cymene, isopropylxylene, ethylisopropylbenzene, diisopropylbenzene, isopropyl-tert-butylbenzene, isopropylnaphthalene and isopropylbiphenyl, with a molecular oxygen containing gas in the presence of an alkaline stabilizer to obtain an aralkyl hydroperoxide-containing mixture,
(2) removing the alkaline stabilizer and substances insoluble in said hydroperoxide-containing mixture by filtration, sedimentation or liquid separation,
(3) contacting the resulting mixture with an acid to produce an aromatic hydroxy compound and an alkyl ketone or cyclohexanone, for the case in which said alkyl aromatic hydrocarbon is cyclohexylbenzene, the improvement which comprises, after the aforementioned step (2) and prior to the aforementioned step (3), thoroughly dispersing and mixing the resulting mixture with an aqueous solution of an alkali selected from the group consising of ammonia, oxides and hydroxides of sodium, potassium and calcium, and carbonates, bicarbonates, phosphates and hydrogen phosphates of sodium and potassium at a temperature of from room temperature to 100° C., and thereafter separating said aqueous solution of alkali from said hydroperoxide-containing mixture whereby acidic corrosive impurities are removed from said hydroperoxide-containing mixture.

References Cited
UNITED STATES PATENTS

| 2,628,983 | 2/1953 | Aller et al. | 260—593 A |
| 2,683,751 | 7/1954 | Filar | 260—593 A |
| 2,719,864 | 10/1955 | Conner, Jr. | 260—593 A |
| 2,881,222 | 4/1959 | Joris et al. | 260—593 A |
| 2,989,566 | 6/1961 | Young | 260—593 A |
| 2,737,480 | 3/1956 | Adams et al. | 260—593 A |

DANIEL D. HORWITZ, Primary Examiner